US011455591B2

(12) United States Patent
Lee et al.

(10) Patent No.: US 11,455,591 B2
(45) Date of Patent: Sep. 27, 2022

(54) SERVICE MANAGEMENT (71) Applicant: International Business Machines Corporation, Armonk, NY (US)

(72) Inventors: James Lee, Saffron Walden (GB); Jack Anthony Woodhouse, Lowestoft (GB); Heloise Rozes, London (GB); Dominik Kloepfer, Cambridge (GB); Grace Jansen, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/515,070

(22) Filed: Jul. 18, 2019

(65) Prior Publication Data

US 2021/0019682 A1 Jan. 21, 2021

(51) Int. Cl.
*G06Q 10/06* (2012.01)
*G01G 19/52* (2006.01)
(Continued)

(52) U.S. Cl.
CPC ....... *G06Q 10/06393* (2013.01); *G01G 19/44* (2013.01); *G01G 19/52* (2013.01); *G04F 13/00* (2013.01); *G06N 20/00* (2019.01); *G06Q 10/06395* (2013.01); *G06Q 10/06398* (2013.01); *G06Q 50/12* (2013.01); *G06V 40/103* (2022.01); *G06V 40/20* (2022.01); *H04L 67/10* (2013.01)

(58) Field of Classification Search
None
See application file for complete search history.

(56) References Cited

U.S. PATENT DOCUMENTS 5,083,638 A * 1/1992 Schneider ............... A47F 9/048
177/25.15
5,739,757 A 4/1998 Gioutsos
(Continued)

FOREIGN PATENT DOCUMENTS

CN 104677481 A 6/2015
WO 2009062614 A2 8/2009

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Alan Torrico-Lopez
(74) *Attorney, Agent, or Firm* — Brian M. Restauro (57) ABSTRACT Method and system are provided for customer table service management. The method includes receiving sensor load data over time from a customer table. The method analyzes the sensor load data during a waiting time between a time of one or more customers arriving at the table and a time of consumables being served to the table to learn background noise data of the one or more customers. The method further analyzes the sensor load data during a dining time after the time of consumables being served to the table to detect one or more events that require a service action, wherein analyzing the sensor load data during the dining time removes the learnt background noise data to distinguish sensor load data changes relating to consumption of the consumables on the table. The method outputs event detection notifications to prompt the required service action.

18 Claims, 6 Drawing Sheets

(51) Int. Cl.
  *G06N 20/00* (2019.01)
  *G01G 19/44* (2006.01)
  *G04F 13/00* (2006.01)
  *H04L 67/10* (2022.01)
  *G06Q 50/12* (2012.01)
  *G06V 40/20* (2022.01)
  *G06V 40/10* (2022.01)

(56) References Cited

U.S. PATENT DOCUMENTS

| | | | |
|---|---|---|---|
| 2005/0080533 A1 | 4/2005 | Basir | |
| 2009/0132128 A1* | 5/2009 | Marriott | B60R 22/48 701/45 |
| 2014/0379175 A1* | 12/2014 | Mittermeier | B60R 25/2045 701/2 |
| 2016/0217536 A1* | 7/2016 | Camp | G06Q 50/12 |
| 2016/0350818 A1 | 12/2016 | Saeed | |
| 2017/0083991 A1* | 3/2017 | Ghosh | G01G 19/52 |
| 2017/0283086 A1* | 10/2017 | Garing | B64D 45/0005 |
| 2018/0001184 A1* | 1/2018 | Tran | G06F 1/163 |
| 2018/0310892 A1* | 11/2018 | Perschbacher | A61B 5/686 |
| 2020/0103271 A1* | 4/2020 | Abou Mahmoud | G01G 19/414 |
| 2020/0214456 A1* | 7/2020 | Jacobs | A47C 7/725 |
| 2020/0234086 A1* | 7/2020 | Taha | G06K 9/6257 |
| 2020/0342274 A1* | 10/2020 | ElHattab | G08G 1/09623 |
| 2020/0356910 A1* | 11/2020 | Nguyen | G06K 19/07762 |
| 2020/0401912 A1* | 12/2020 | Sert | G06N 5/04 |
| 2021/0366033 A1* | 11/2021 | Yamamoto | G06F 3/011 |

* cited by examiner

SERVICE MANAGEMENT

BACKGROUND

The present invention relates to service management, and more specifically, to managing waiting periods during customer table service.

A Point of Sale (POS) system that track the time and place where a transaction is completed. At the point of sale, the system can calculate the amount owed by the customer, indicates that amount, may prepare an invoice for the customer (which may be a cash register printout). A customer can then make a payment to the merchant in exchange for goods or after provision of a service. After receiving payment, the system may issue a receipt for the transaction, which is usually printed but can be dispensed with or sent electronically.

In the hospitality industry, POS system capabilities can also diverge significantly. For instance, a restaurant is typically concerned about how the sale window functions, whether it has functionality such as for creating item buttons, for various discounts, for adding a service charge, for holding of receipts, for queuing, for table service as well as for takeaways, merging and splitting of a receipt. Other services may require an additional scheduling window with historical records of customers' attendance and preferences.

Certain POS systems for restaurants are enabling the automation of many activities that once required considerable manual monitoring and action. In some instances, other technologies are implemented in conjunction with POS systems that limit the role of restaurant servers. For example, certain devices (e.g., tablets) placed at a customer table can provide increased accuracy and expedience in ordering and can be used to pay and provide feedback.

SUMMARY

According to an aspect of the present invention there is provided a computer-implemented method for customer table service management, comprising: receiving sensor load data over time from a table in a food establishment; analyzing the sensor load data during a waiting time between a time of one or more customers arriving at the table and a time of consumables being served to the table to learn background noise data of the one or more customers; analyzing the sensor load data during a dining time after the time of consumables being served to the table to detect one or more events that require a service action, wherein analyzing the sensor load data during the dining time removes the learnt background noise data to distinguish sensor load data changes relating to consumption of the consumables on the table; and outputting event detection notifications to prompt the required service action.

According to another aspect of the present invention there is provided a system for customer table service management comprising: a processor and a memory configured to provide computer program instructions to the processor to execute the function of components of a service analyzing system including: a sensor data receiving component for receiving sensor load data over time from a table in a food establishment; a waiting time analyzing component for analyzing the sensor load data during a waiting time between a time of one or more customers arriving at the table and a time of consumables being served to the table to learn background noise data of the one or more customers; a dining time analyzing component for analyzing the sensor load data during a dining time after the time of consumables being served to the table including a detecting component for detecting one or more events that require a service action, and a background component for analyzing the sensor load data during the dining time by removing the learnt background noise data to distinguish sensor load data changes relating to consumption of the consumables on the table; and an output component for outputting event detection notifications to prompt the required service action.

According to another aspect of the present invention there is provided a computer program product for customer table service management, the computer program product comprising a computer readable storage medium having program instructions embodied therewith, the program instructions executable by a processor to cause the processor to: receive sensor load data over time from a table in a food establishment; analyze the sensor load data during a waiting time between a time of one or more customers arriving at the table and a time of consumables being served to the table to learn background noise data of the one or more customers; analyze the sensor load data during a dining time after the time of consumables being served to the table to detect one or more events that require a service action, wherein analyzing the sensor load data during the dining time removes the learnt background noise data to distinguish sensor load data changes relating to consumption of the consumables on the table; and output event detection notifications to prompt the required service action.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention recognize that food establishment service staff often need to cater to the needs of multiple tables that require service at different stages of a dining experience. Embodiments of the present invention recognize that it is frustrating for customers to wait for service when they have finished a stage of dining. On the other hand, staff regularly checking at tables wastes the time of the service staff, makes the restaurant unnecessarily crowded, and is disruptive to a dining experience. In some establishments, a button may be provided at a table that can be pressed by the customers for attendance. This requires an active input that diminishes the experience of unprompted service by staff.

Embodiments of the present invention improve restaurant management systems that can include integration with existing Point of Sale (POS) systems by utilizing a combination of one or more sensors to identify which tables need service, predict the needs of users at the table (e.g., using machine learning techniques and natural language processing techniques to associated the behavior of users at the table) over time and at different stages of the dining experience, such as awaiting service, during dining, and awaiting payment.

A sensor system may be provided for measuring load (of the table) and impulse on a table over time, which provides sensor data to a service analyzing system to determine events associated with different stages of a dining experience such as awaiting service and dining states.

The described service analyzing system uses machine learning to use learning data to intelligently analyze the load change of the table. A time between customers arriving and food arriving (referred to as a waiting state) is used to model the background noise and usual load patterns of the customers, referred to as background load data. This is used to provide a background noise for a table or each customer based on their behavior and specific mannerism that affects the load on the table. For example, such as a customer leaning on the table and/or placing non-food items on the table (for example, handbags or phones).

During a dining state, load data on the table will change with addition or subtraction of static loads and as food and drinks are added to the table and then gradually consumed. The machine learning in the dining state analyzes load changes on the table to identify and remove the background load data from the food consumption load data. It will associate certain behaviors of load with certain physical behaviors, which may be used to distinguish customers' behavior from the food service.

Once food and beverages have been added to the table, the gradual decrease in load can be associated with their consumption and once this plateaus, the system can register that the customers have finished eating and that they will now need attending once more by the service staff.

The learning and analysis may be provided for a whole table in which case sensor data in the form of load and impulse data may be averaged across the table.

In another embodiment, the learning and analysis may be provided for each individual customer. By personalizing the learning to each specific customer, the system accurately detects when each guest at the table needs serving by filtering out the background noise made by each customer.

The table status together with other table statuses may be visualized at a central monitor for service staff to refer to and identify which tables need servicing. Prioritization of table service may also be calculated to determine the order in which customers require attention.

Figure 1:
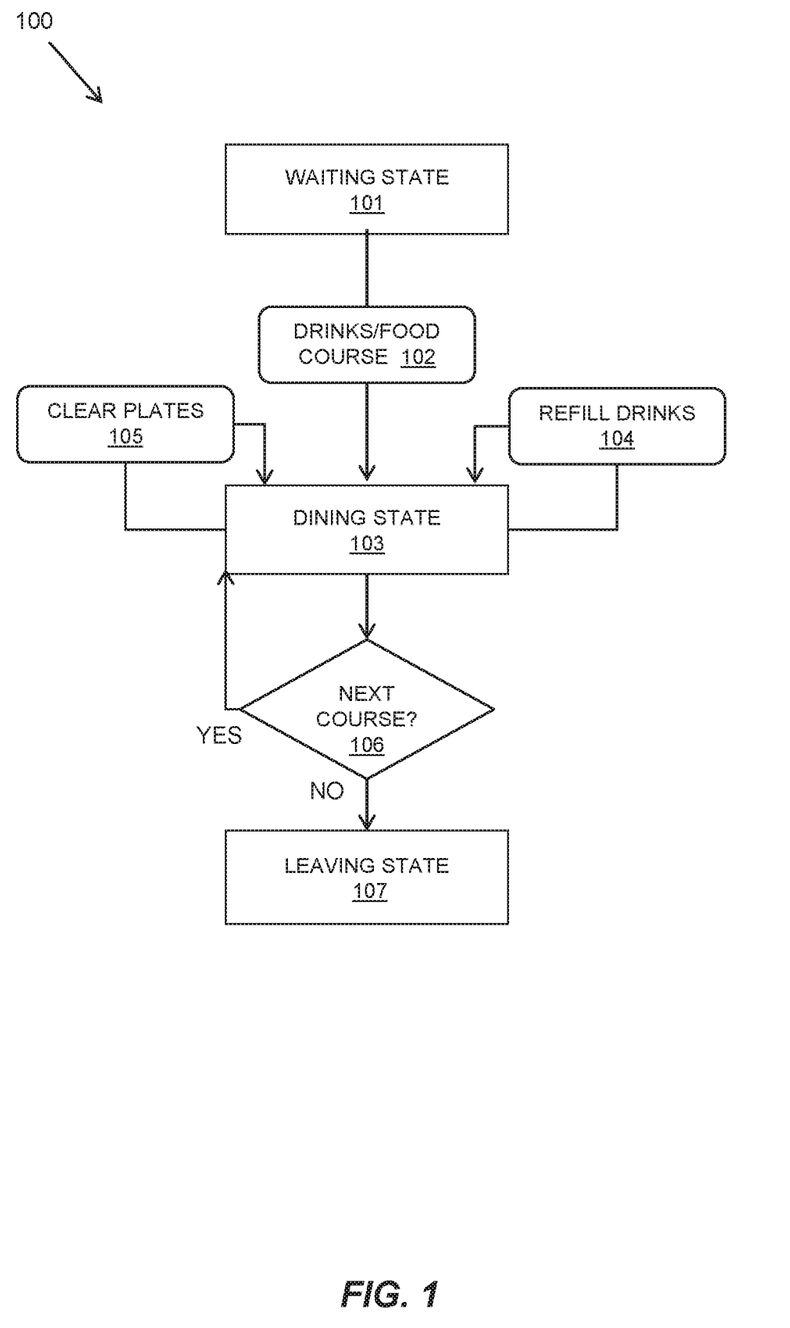
FIG. 1 is a flow diagram of an example service flow during a dining experience used in describing the present invention.

Referring to FIG. 1, a flow diagram 100 shows the flow of an example typical dining experience. Much more complex event flows may be implemented, and this one is used for demonstrative purposes.

The dining experience can be most simply split into three states: a waiting state during a waiting time period, a dining state during a dining time period, and a leaving state during a leaving time period. The purpose of the described method and system is to detect load data during the waiting state and dining state in order to detect events during the dining state. To do this a model is constructed, either for widespread distribution or per restaurant, of what events are expected to occur within a state that would require the attention of service staff. For example, events that require attention of the service staff may include: ordering drinks, choosing food for one or more courses, clearing plates of one or more courses, ordering coffee, ordering more drinks, ordering the bill, paying the bill, etc.

For exemplary purposes a simple model is described as shown in FIG. 1. A waiting state 101 is a state between a new customer occupancy at a table and the first service of drinks or a first course 102. A dining state 103 is the state during the service of the table including multiple loops of refilling drinks 104, providing food, and clearing plates 105.

There is a decision node 106 for a next course, which may occur after clearing the table, in order to decide the next customer state. The decision node 106 may determine if there is a next course, which may be ascertained automatically from the order of the customers that may be loaded in the software or manually by a member of service staff. This may be another course in the dining state 103 or a continuation to a leaving state 107 in which the customers receive and pay the bill and leave.

In reality all these events would result in a member of the service staff servicing the table. Thus, even if an event detection was incorrect the result would simply be that the service staff observes no service is needed. Even so time would have been wasted, so the challenge for the described method and system is differentiating the defined events from anomalous ones. A calibration method is outlined which reduce false-positive events.

A sensor system may be provided at each table at a food establishment. The sensor system may include one or more load sensors and, optionally, one or more impulse sensors. The load sensors may sense a force exerted on the table and may measure a total load and load distribution over time. The impulse sensors may measure impulses or vibrations on the table over time.

The sensors may be in communication with a microprocessor at the table, where at least some of the processing of the sensor data may take place. The sensors and/or the microprocessor may be in communication with a computing system providing a central service analyzing system. A service staff central console providing an output display may also be provided for providing information to the service staff.

The physical implementation of the sensor system depends on the configuration of the table. If the table is multi-legged, then load cells may be built into each leg or, for simpler implementation, placed between the floor and the leg. The load cells can then be used to calculate the total load of the table by summing the load by leg and also be used to calculate the distribution of load across the table. If the table is single-legged, then a load cell and torque transducer may be built into the leg; this would allow for detection of total load and load distribution respectively.

A load cell is a transducer that is used to create an electrical signal whose magnitude is directly proportional to the force being measured. There are various different types of load cells that are available and may be used in this context. A most common type is a strain gauge that is bonded onto a structural member that deforms when weight is applied. Load cells may be expected to have a resolution of 0.02% of total mass or greater. Assuming a generous table weight of 60 kg, distributed across three legs, then the resolution would be 4 grams.

Additionally, multiple low-frequency accelerometers may be provided as impulse sensors. These may be attached to the underside of the table to detect impulses or vibrations on the table. These would triangulate the location of an impulse on the table. A suitable impulse sensor may be a vibration and acceleration sensor in the form of a piezoelectric accelerometer sensor.

The total load, load distribution and impulse location are outputted from these physical sensors as time signals. These are received by a service analyzing system. A microprocessor also attached to the table (for example, hidden discretely on the table's underside or even built into the material) may be wired to the sensors and used to broadcast wirelessly to the service analyzing system. A central console with a visual interface may be provided for output of the service analyzing system and may be located conveniently for the service staff.

Depending on the implementation, the processing of signals and event detection may occur on a microprocessor, or the raw or processed signals may be broadcast to the service analyzing system to be processed there. The central console may be attached to a visual interface such as a monitor which may display an outline of the restaurant's tables and indicate when one needs servicing.

The sensor data may be processed as described further below in order to detect if events according to the load on the table. The sensor data may process the change in table load against a database of known loads, as well as the behavior of load change over time and load distribution, in order to identify an item on the table and a stage of the service.

Furthermore, if a customer order is stored electronically, the sensor data may be used to check that all food and drink has been successfully delivered to the table, by comparing table load with the sum load of the ordered items with their plates, cutlery, glasses, etc.

Figure 2:
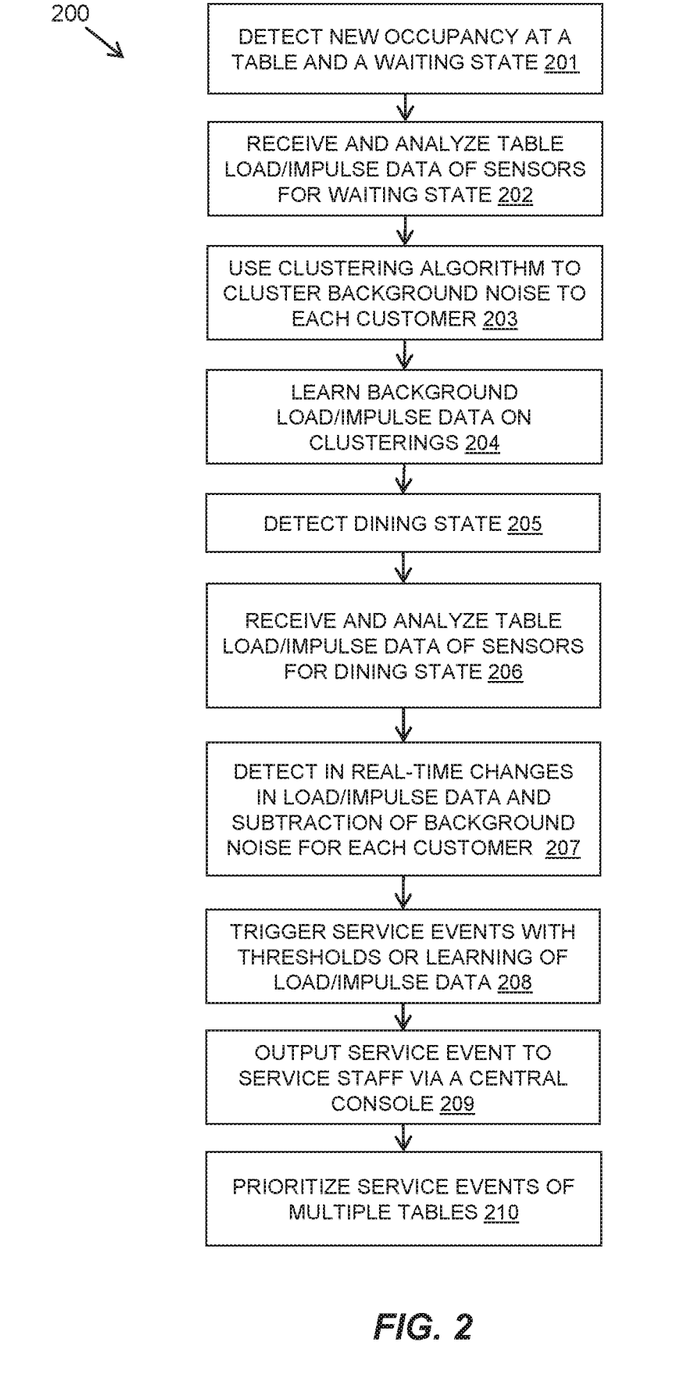
FIG. 2 is a flow diagram of an example embodiment a method in accordance with the present invention.

Referring to FIG. 2, a flow diagram 200 shows an example embodiment of the described method carried out at a service analyzing system in response to input sensor data. The service analyzing system uses a signal processing algorithm to determine background data and to detect events. The signal processing algorithm uses a temporal machine learning algorithm, for example, recurrent neural networks (RNNs) with long short-term memory (LSTM) units.

A new occupancy at a table may be detected 201 indicating the start of a waiting state. The new occupancy may be a party of multiple customers that may take seats at the table at the same time or over a period of time.

The number of customers at a table is recorded on their arrival using existing methods, for example, manually by a member of service staff or automatically using seat weight detection. The automatic seat detection has the advantage of providing the additional input of which seats around the table are occupied.

During the waiting state, sensor data is received and analyzed 202 as table load and impulse data and is used for calibration of background load data. In this described embodiment, the data is analyzed to distinguish each customer at a table. In an alternative embodiment, the data may be analyzed for the overall customer behavior at a table. The data during the waiting state serves two functions as follows.

Firstly, the position of each customer is determined and background noise is clustered 203 for each customer. The number of customers at the table and the load distribution over time are used as inputs to a K-means clustering algorithm. The algorithm outputs the zones of influence on the table to each customer with respect to the load distribution sensor.

Secondly, the data is used to learn background load and impulse data on the clustering 204 by using the data as a training set for the machine learning algorithm to remove anomalous behavior of customers. For example, a certain customer may lean on their elbow with a specific amount of load or another customer may place their mobile phone on the table or a third may rap their fingers on the table. These physical behaviors would be reflected in the total load, load distribution, or accelerometer signals through characteristics that may be abstracted by the machine learning algorithm. After the calibration stage the characteristics determined in this background data may be removed from the signal as anomalous.

During the waiting state, the model is expecting the arrival of drinks or the first course as a detection 205 of service starting and entering the dining state. This event would be triggered by impulse detection from the accelerometer and an increase in the load signal due to glasses or plates being placed on the table.

During the dining state, sensor data is received and analyzed 206 by the signal processing algorithm as table load and impulse data and is used for event triggering.

At this point the model has new expectations for what events may occur, namely: clear plates, refill drinks, and clear table. Each event is associated with a certain behavior of the sensor time signals. For this example:

Refilling drinks would be triggered by a signal from the accelerometer (due to impulse of glass being put down) accompanied by a change in load equal to that of an empty glass.

Clearing plates would be triggered when the load signal from a single customer's zone of influence has ceased to gradually decrease (suggesting the customer has finished eating).

Clearing table would be triggered when the load signal becomes stable, which indicates that the customers are no longer picking up cutlery or glasses.

The method detects 207 real time changes in the load and impulse data and removes the background noise data for each customer. There may be three types of signals: total load, load distribution and accelerometer or impulse. The signals from each of these before processing will be noisy in the sense that their value at a given time is influenced by behavior not directly relevant to event detection. Therefore, the calibration training data and other anomalous behavior not specific to this group of customers is identified and filtered out of the signal at this stage. This results in a processed signal that only contains behavior directly relevant to event detection.

The method triggers 208 service events. The event detection algorithm may either be another machine learning algorithm or a simple threshold for the signal or rate of change of signal. If a machine learning algorithm is used, prior labelling of the behavior of time signals when events occur is necessary. The prior labelling data could be obtained from many recordings of customers dining and manual labelling of each event as it occurs.

The processed signal is used for event detection. The trained machine learning algorithm or thresholds algorithm receives this processed signal and the current state (awaiting service or dining) from which it will determine if an event has occurred. When an event is identified it will be output 209 to the food establishment's central console to be actioned by a waiter.

The processed signal may trigger the end event at which point the service flow may enter the leaving state during which the bill is paid and the customers leave.

The central console may prioritize 210 service events of multiple tables to aid the service staff in optimal servicing the tables in an efficient manner.

Figure 3:
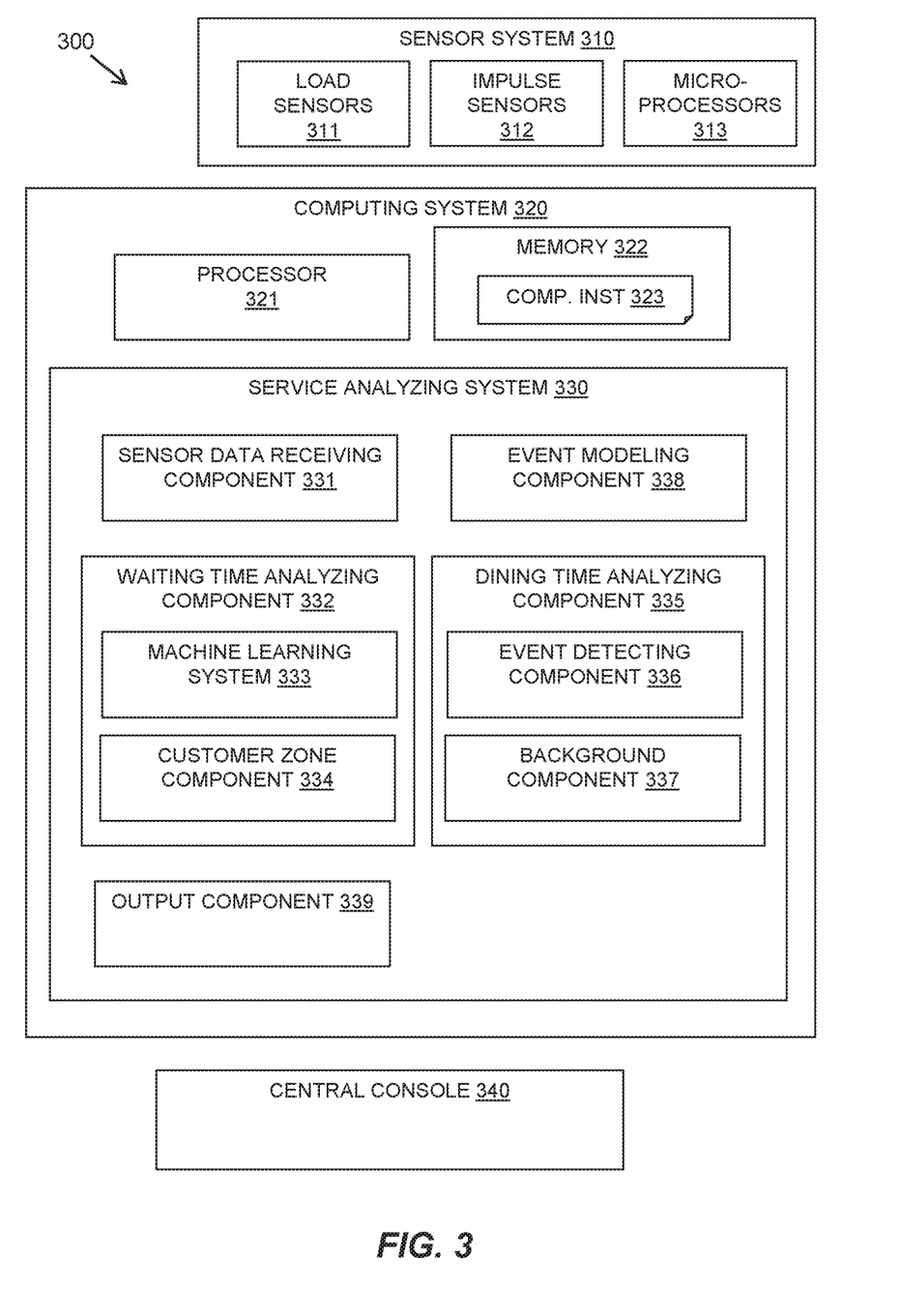
FIG. 3 is block diagram of an example embodiment of a system in accordance with the present invention.

Referring to FIG. 3, a block diagram shows an example embodiment of the described system 300.

The system 300 may include a sensor system 310 at each table including load sensors 311, impulse sensors 312 and a microprocessor 313 as described above. The sensors 311, 312 may transmit directly or via the microprocessor 313 to a service analyzing system 330 at a computing system 320. The service analyzing system 330 may output event notifications to a central console 340 including a visual interface for serving staff in a food establishment.

The computing system 320 of the service analyzing system 330 may be provided locally at the food establishment or remotely including as a cloud service. The computing system 320 may include at least one processor 321, a hardware module, or a circuit for executing the functions of the described components which may be software units executing on the at least one processor. Multiple processors running parallel processing threads may be provided enabling parallel processing of some or all of the functions of the components. Memory 322 may be configured to provide computer instructions 323 to the at least one processor 321 to carry out the functionality of the components.

The service analyzing system 330 may include a sensor data receiving component 331 for receiving sensor load data over time from the sensor system 310 of a table in a food establishment.

The service analyzing system 330 may include an event modeling component 338 for modeling multiple events that require a service action in the form of a pattern of sensor load data over time.

The service analyzing system 330 may include a waiting time analyzing component 332 for analyzing the sensor load data during a waiting time between a time of one or more customers arriving at the table and a time of consumables being served onto the table to learn background noise data of the one or more customers. The waiting time analyzing component 332 may include a machine learning system 333 for using the sensor load data as a training set for a machine learning algorithm to identify background noise data for one or more customers. The waiting time analyzing component 332 may also include a customer zone component 334 for determining a zone of influence of a customer on the table by using a clustering algorithm to cluster the sensor load data by customer and identifying background noise data for each customer.

The service analyzing system 330 may include a dining time analyzing component 335 for analyzing the sensor load data during a dining time after the time of consumables being served to the table including an event detecting component 336 for detecting one or more events that require a service action. The event detecting component 336 may include detecting an addition of consumable load data and monitoring the consumable load data until a plateau indicating a required service action and may use the modeled events of an event modeling component 338.

The dining time analyzing component 335 may also include a background component 337 for analyzing the sensor load data during the dining time by removing the learnt background noise data to distinguish sensor load data changes relating to consumption of the consumables on the table.

The dining time analyzing component 335 may use a machine learning algorithm or threshold algorithm using prior labelling of behavior of sensor load data over time based on past customer behavior.

The service analyzing system 330 may include an output component 339 for outputting event detection notifications to the central console 340 to prompt the required service action.

Figure 4:
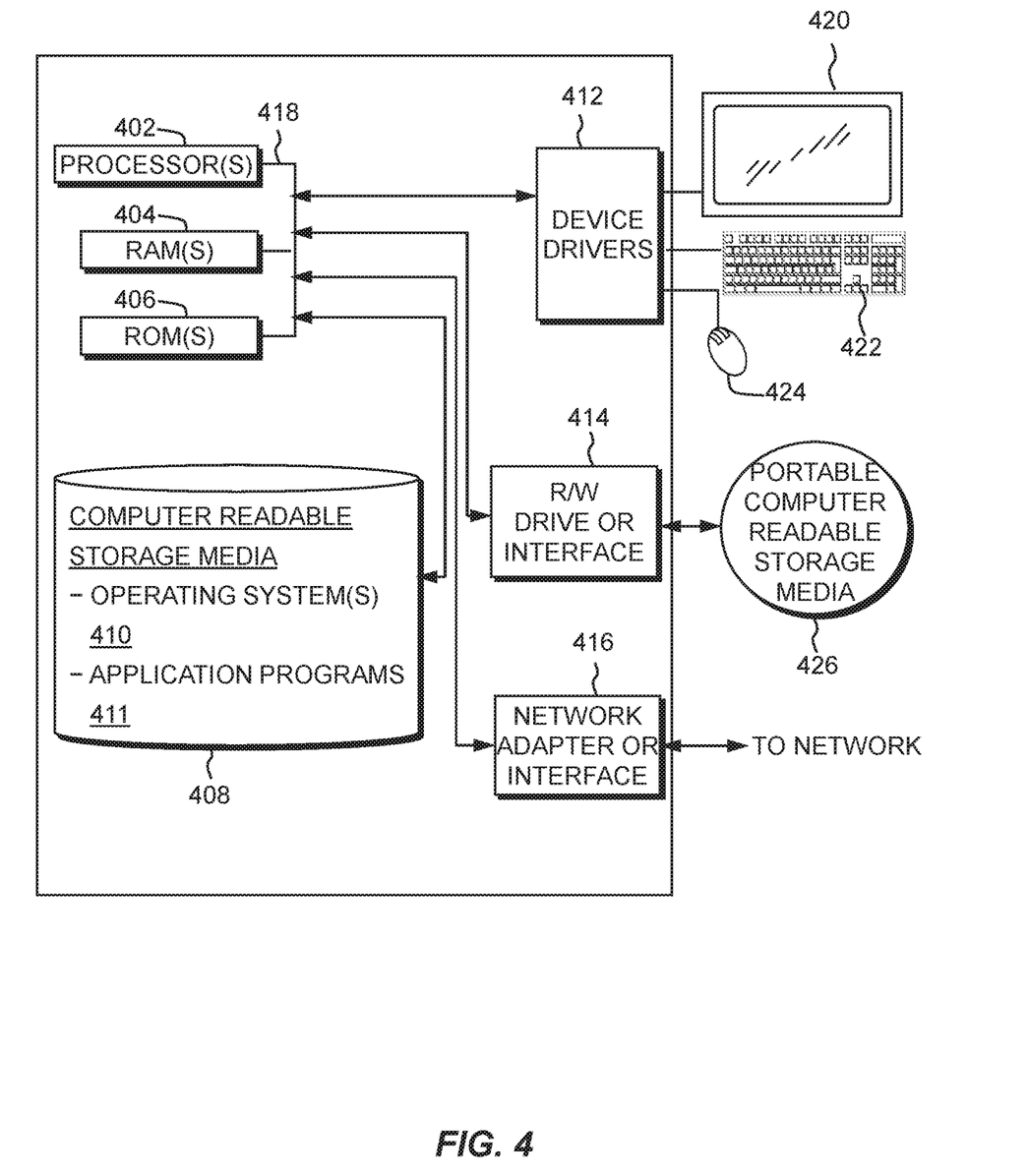
FIG. 4 is a block diagram of an embodiment of a computer system or cloud server in which the present invention may be implemented.

FIG. 4 depicts a block diagram of components of the computing system 320 of the system 300 of FIG. 3, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing system 320 can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the service analyzing system 330 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 320 can also include a R/W drive or interface 414 to read from and write to one or more portable computer readable storage media 426. Application programs 411 on computing system 320 can be stored on one or more of the portable computer readable storage media 426, read via the respective R/W drive or interface 414 and loaded into the respective computer readable storage media 408.

Computing system 320 can also include a network adapter or interface 416, such as a TCP/IP adapter card or wireless communication adapter. Application programs 411 on computing system 320 can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing system 320 can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
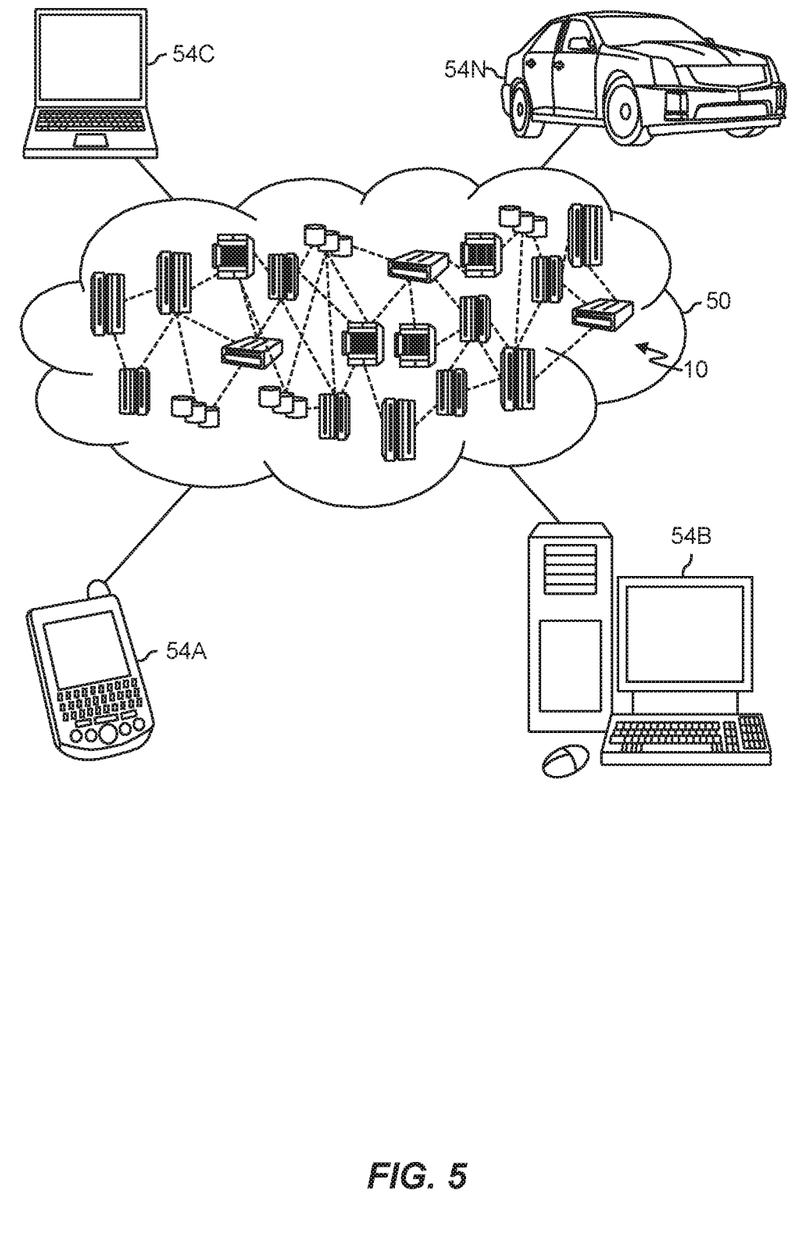
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
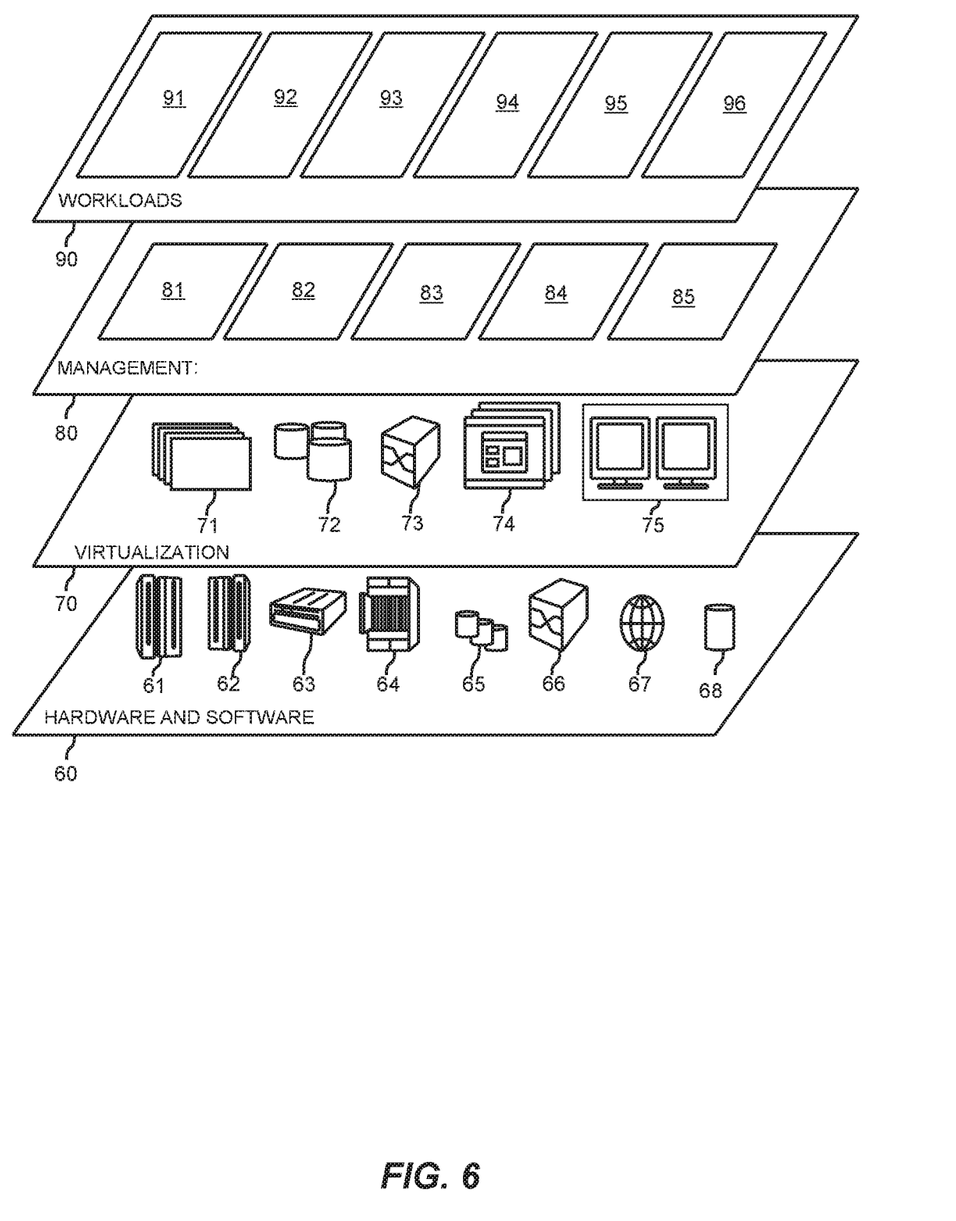
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and customer table service management processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method comprising:
   improving point of sale devices based, at least in in part, on predicted loads of a customer table, wherein improving point of sale devices comprises:
   receiving sensor load data over time from the customer table;
   analyzing the sensor load data during a waiting time between a time of one or more customers arriving at the table and a time of consumables being served to the table to learn background noise data of the one or more customers, wherein analyzing the sensor load data during the waiting time includes using the sensor load data as a training set for a machine learning algorithm to identify background noise data for one or more customers;
   learning background noise data by distributing the one or more customers over time in a K-means clustering algorithm;
   identifying respective zones of influence on the customer table to each of the one or more customers;
   removing anomalous behavior that affects a predicted time in which consumables served to the table reaches completion based on its' potential influence on at least a respective zone of the identified zones associated with a respective customer; and
   generating a visual interface display that is shown prior to a predicted time in which consumables served to the table reaches completion.

2. The method as claimed in claim 1, wherein receiving sensor load data includes receiving data relating to a total load on the table, a load distribution on the table, and impulse data in the form of a sudden change in load on the table.

3. The method as claimed in claim 1, wherein analyzing the sensor load data during the waiting time includes determining a zone of influence of a customer on the table by using a clustering algorithm to cluster the sensor load data by customer and identifying background noise data for each customer.

4. The method as claimed in claim 3, wherein analyzing the sensor load data during the dining time analyzes the sensor load data for each customer during the dining time and removes the learnt background noise data for each customer.

5. The method as claimed in claim 1, wherein analyzing the sensor load data during the dining time to detect one or more events that require a service action includes detecting an addition of consumable load data and monitoring the consumable load data until a plateau indicating a required service action.

6. The method as claimed in claim 1, including modeling multiple events that require a service action in the form of a pattern of sensor load data over time and wherein analyzing the sensor load data during the dining time to detect one or more events that require a service action compares the sensor load data to the modeled events.

7. The method as claimed in claim 6, wherein the analyzing of the sensor load data during the dining time is carried out by a machine learning algorithm using prior labelling of behavior of sensor load data over time based on past customer behavior.

8. The method as claimed in claim 6, wherein the analyzing of the sensor load data during the dining time is carried out by a threshold algorithm to determine a threshold similarity for the comparison of sensor load data to the modeled events.

9. The method as claimed in claim 1, including receiving details of the consumables ordered by the one or more customers and comparing known loads of the consumables to the sensor load data to determine that all consumables have been provided to the table.

10. The method as claimed in claim 1, including prioritizing detected events for multiple tables based on service parameters.

11. A computer system comprising:
a processor and a memory configured to provide computer program instructions to the processor to execute the function of components of a service analyzing system including:
a sensor data receiving component for receiving sensor load data over time from a table in a food establishment;
a waiting time analyzing component for analyzing the sensor load data during a waiting time between a time of one or more customers arriving at the table and a time of consumables being served to the table to learn background noise data of the one or more customers;
a dining time analyzing component for analyzing the sensor load data during a dining time after the time of consumables being served to the table including an event detecting component for detecting one or more events that require a service action and a background component for analyzing the sensor load data during the dining time by removing the learnt background noise data to distinguish sensor load data changes relating to consumption of the consumables on the table, wherein analyzing the sensor load data during the waiting time includes using the sensor load data as a training set for a machine learning algorithm to identify background noise data for one or more customers;
a dining time analyzing component for:
learning background noise data by distributing the one or more customers over time in a K-means clustering algorithm,
identifying respective zones of influence on the customer table to each of the one or more customers,
removing anomalous behavior that affects a predicted time in which consumables served to the table reaches completion based on its' potential influence on at least a respective zone of the identified zones associated with a respective customer, and
an output component for generating a visual interface display that is shown prior to a predicted time in which consumables served to the table reaches completion.

12. The system as claimed in claim 11, including a sensor system provided at a table and in data communication with the service analyzing system, wherein the sensor system includes one or more load sensors and one or more impulse sensors providing data relating to a total load on the table, a load distribution on the table, and impulse data in the form of a sudden change in load on the table.

13. The system as claimed in claim 11, wherein the waiting time analyzing component includes a customer zone component for determining a zone of influence of a customer on the table by using a clustering algorithm to cluster the sensor load data by customer and identifying background noise data for each customer.

14. The system as claimed in claim 11, wherein the event detecting component includes detecting an addition of consumable load data and monitoring the consumable load data until a plateau indicating a required service action.

15. The system as claimed in claim 11, including an event modeling component for modeling multiple events that require a service action in the form of a pattern of sensor load data over time and wherein the dining time analyzing component compares the sensor load data to the modeled events.

16. The system as claimed in claim 15, wherein the dining time analyzing component uses a machine learning algorithm or threshold algorithm using prior labelling of behavior of sensor load data over time based on past customer behavior.

17. The system as claimed in claim 11, including a central console including a visual display for displaying event detection notifications provided by the output component.

18. A computer program product, the computer program product comprising:
a computer readable storage medium having program instructions embodied therewith, the program instructions executable by a processor to cause the processor to:
improve point of sale devices based, at least in in part, on predicted loads of a customer table, wherein improving point of sale devices comprising program instructions executable by a processor to cause the processor to:
receive sensor load data over time from the table in a food establishment;
analyze the sensor load data during a waiting time between a time of one or more customers arriving at the table and a time of consumables being served to the table to learn background noise data of the one or more customers, wherein the program instructions to analyze the sensor load data during the waiting time includes using the sensor load data as a training set for a machine learning algorithm to identify background noise data for one or more customers;
learning background noise data by distributing the one or more customers over time in a K-means clustering algorithm;
identifying respective zones of influence on the customer table to each of the one or more customers;
removing anomalous behavior that affects a predicted time in which consumables served to the table reaches completion based on its' potential influence on at least a respective zone of the identified zones associated with a respective customer; and
generating a visual interface display that is shown prior to a predicted time in which consumables served to the table reaches completion.

* * * * *